(12) United States Patent
Bates et al.

(10) Patent No.: US 6,917,436 B2
(45) Date of Patent: *Jul. 12, 2005

(54) METHOD AND COMPUTER PROGRAM PRODUCT FOR IMPLEMENTING WEB BASED DOCUMENT PRINTING

(75) Inventors: Cary Lee Bates, Rochester, MN (US); Paul Reuben Day, Rochester, MN (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 30 days.

(21) Appl. No.: 09/291,245

(22) Filed: Apr. 13, 1999

(65) Prior Publication Data

US 2003/0160994 A1 Aug. 28, 2003

(51) Int. Cl.[7] .......................... G06F 15/00; G06F 17/00
(52) U.S. Cl. .................... 358/1.15; 358/1.15; 358/1.14; 715/517
(58) Field of Search .............................. 358/1.15, 1.14, 358/448, 1.18, 1.09, 1.17; 707/101, 523; 715/517, 101, 515

(56) References Cited

U.S. PATENT DOCUMENTS

| | | | | |
|---|---|---|---|---|
| 5,991,514 A | * | 11/1999 | Nielsen | 358/1.14 |
| 6,006,264 A | * | 12/1999 | Colby et al. | 709/226 |
| 6,061,700 A | * | 5/2000 | Brobst et al. | 707/517 |
| 6,185,588 B1 | * | 2/2001 | Olson-Williams et al. | 707/515 |
| 6,320,671 B1 | * | 11/2001 | Kelley et al. | 358/1.18 |

* cited by examiner

*Primary Examiner*—Kimberly Williams
*Assistant Examiner*—Saeid Ebrahimi-Dehkordy
(74) *Attorney, Agent, or Firm*—Joan Pennington

(57) ABSTRACT

A method, apparatus and computer program product are provided for implementing web based document printing. A print index is obtained. User selected uniform resource locators (URLs) in the print index are identified. The URLs in the print index are sequentially printed. The print index stores a list of user selected uniform resource locators (URLs) to be printed. A web based printing program utilizes the stored print index for printing a document including the list of user selected uniform resource locators (URLs).

4 Claims, 8 Drawing Sheets

300

```
OPTIONS
  ⦿ CONFIRM PRINT INDEX
KIND OF MUTI-PRINT:
  ⦿ HONOR HTML TAGS
  ○ PRINT INDEX
  ○ MANUAL
  ○ SCATTERED
  ○ CURRENT PAGE ONLY
KIND OF SCATTERED
  ○ LEVEL FIRST
  ⦿ BRANCH FIRST
```

FIG. 3

METHOD AND COMPUTER PROGRAM PRODUCT FOR IMPLEMENTING WEB BASED DOCUMENT PRINTING

FIELD OF THE INVENTION

The present invention relates generally to the data processing field, and more particularly, relates to a method, apparatus and computer program product for implementing web based document printing.

DESCRIPTION OF THE RELATED ART

There is no easy way to efficiently control the printing of documents that are stored on the Web. Often sections of a desired document have different URLs, and one section references other sections using hypertext links. Neither the originator or author of the document or a user can prepare the document for easy printing when the document has several URL segments. A mechanism is needed to easily combine a set of URLs into one contiguous printout for a user selected document.

SUMMARY OF THE INVENTION

A principal object of the present invention is to provide an improved method, apparatus and computer program product for implementing internet web based document printing. Other important objects of the present invention are to provide such internet web based document printing method, apparatus and computer program product that efficiently and effectively facilitates printing particular internet web pages; to provide such internet web based document printing method, apparatus and computer program product substantially without negative effect; and provide such internet web based document printing method, apparatus and computer program product that overcome many of the disadvantages of prior art arrangements.

In brief, a method, apparatus and computer program product are provided for implementing web based document printing. A print index is obtained. User selected uniform resource locators (URLs) are identified in the print index. The URLs in the print index are sequentially printed.

In accordance with features of the invention, the print index stores a list of user selected uniform resource locators (URLs) to be printed. A web based printing program utilizes the stored print index for printing a document including the list of user selected uniform resource locators (URLs).

BRIEF DESCRIPTION OF THE DRAWINGS

The present invention together with the above and other objects and advantages may best be understood from the following detailed description of the preferred embodiments of the invention illustrated in the drawings, wherein:

FIG. 3 is an exemplary display screen of the system of FIG. 1 illustrating a user interface for providing user selected print options in accordance with the preferred embodiment;

DETAILED DESCRIPTION OF THE PREFERRED EMBODIMENTS

Figure 1:
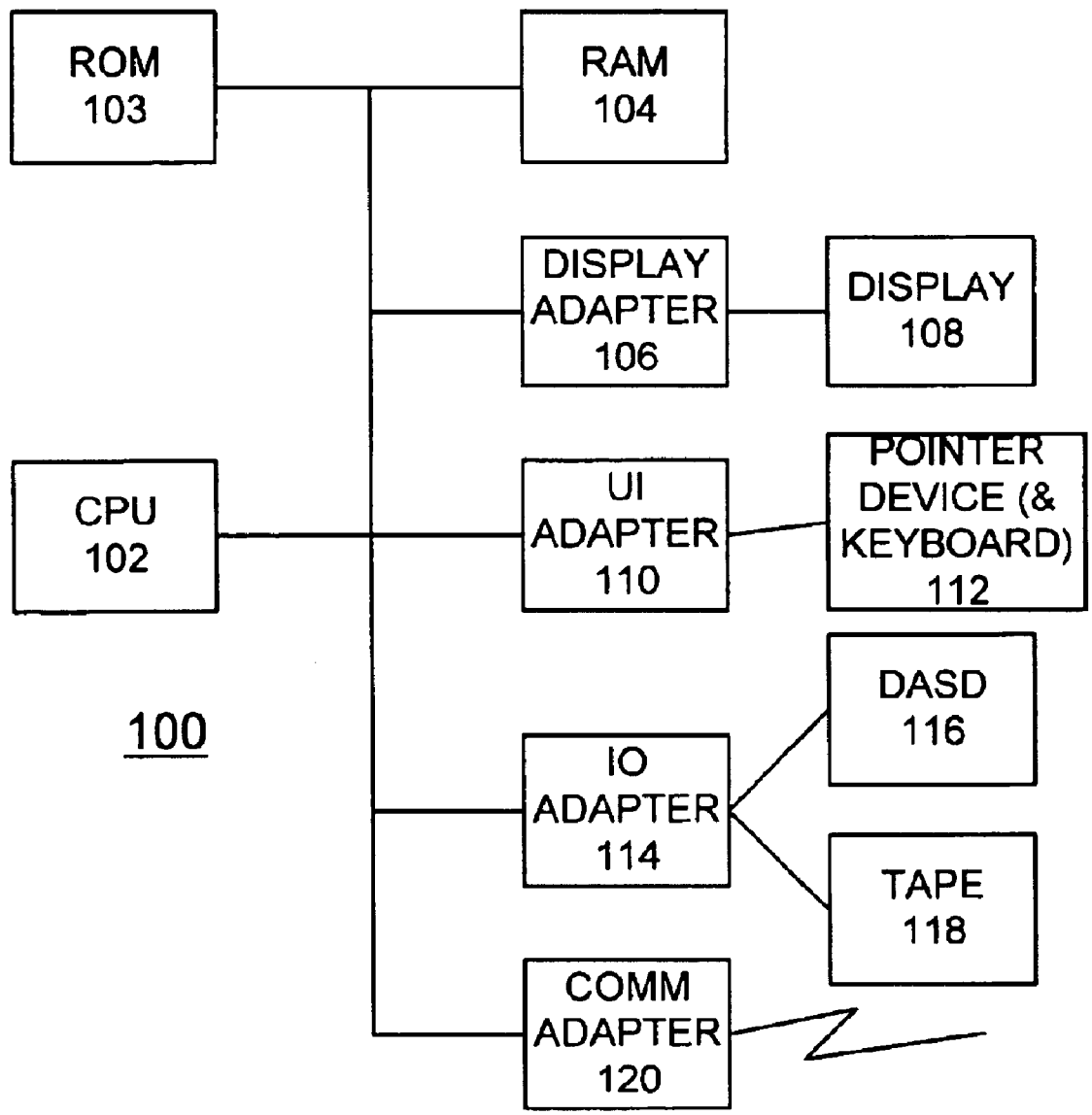
FIGS. 1 and 2 are block diagram representations illustrating a computer system and operating system for implementing a method and computer program product for implementing internet web based document printing in accordance with the invention.
Figure 2:
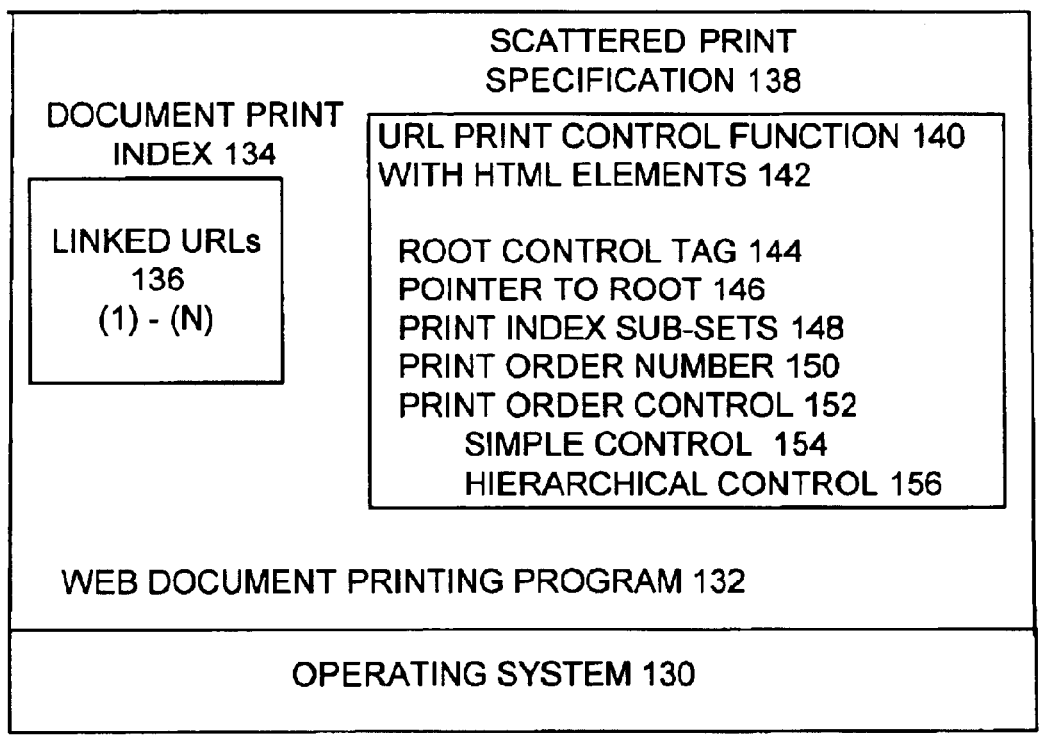

Having reference now to the drawings, in FIGS. 1 and 2, there is shown a computer or data processing system of the preferred embodiment generally designated by the reference character 100. As shown in FIG. 1, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (10) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1.

As shown in FIG. 2, computer system 100 includes an operating system 130 and a web document printing program 132 of the preferred embodiment. In accordance with features of the invention, a document print index 134 of the preferred embodiment includes a list of multiple linked URLs 136 to be printed when a particular document is printed. The document print index 134 is stored at one URL site.

Various commercially available computers can be used for computer system 100, for example, an IBM personal computer. CPU 102 is suitably programmed by the web document printing program 132 to generate display screen, for example as shown in FIG. 3 to receive user document printing selected options, and to execute the flowcharts of FIGS. 4, 5, 6 and 7.

The document print index 134 is explicitly specified by the document originator, and stored in the document root from which the other URLs in the document are linked. A simple example of a specification of the document print index 134 to print five URLs follows in TABLE 1:

TABLE 1

<Print> URL 1 </Print>
<Print> URL 2 </Print>
<Print> URL 3 </Print>
<Print> URL 4 </Print>
<Print> URL 5 </Print>

In accordance with features of the invention, another way to print is via a scattered print specification 138 of one or more URL print functions 140 with HTML tags. Here, the document owner scatters the print commands within the separate URLs that link to other document segments. The anchor HTML element is extended to include a print function 140. For example, <A HREF="[URL 1]">[text for link]</A>, is extended to specify that this URL is to be printed, such as: <A PRINT="YES" HREF="[URL 1]"> [text for link]</A>.

When the document is printed, each anchor tag with PRINT=Yes will cause that URL to print, while anchor tags that do not have PRINT=Yes will not print that URL. When a URL to be printed is downloaded at print time, it is searched for URLs included within the downloaded URL to be printed, thus propagating the print through as many branches as needed.

Using either the document print index 134 or the scattered print specification 138, at print time the URLs to be printed are compiled into the final document, where pagination, section heading numbers, lists, cross references, tables of contents, and the like are applied to the entire document spanning all the URLs to be printed.

In accordance with features of the invention, based upon the document print index 134 and the scattered print specification 138, several functions are provided in the method of the preferred embodiment. For the document print index 134, a window can be provided for user access and control. For example, in the following window presentation in TABLE 2, the user may click URLs 1, 3, and 5 to specify that only these URLs are to be printed on this printout.

TABLE 2

| URL 1< |
| URL 2 |
| URL 3< |
| URL 4 |
| URL 5< |

The document owner can define print index sub-sets of the document to be selected with a single button. For example, for a particular report, clicking summary could automatically select 25 URLs for a 450 page printout. Or, clicking detailed report could select 100 URLs for 2800 pages of the complete report. After generating the sub-set, the user can still access the Print Index to de-select unwanted portions of the sub-set.

Dynamic creation of print index 134 can be used two ways. First, the user has browsed several URLs and wants to print them as a unit. He clicks an option to begin print, at which time the automatic Print Index function is called. Then the user navigates in sequence the desired URLs to be printed. As each URL is navigated it is automatically added to the print index 134. The user can then click a print function and print the navigated pages, with or without ever seeing the system generated print index 134. Second, the document is designed to be printed using the scattered method. As the URLs are gathered to be printed, a print index 134 is generated by the system. Before printing, the system can open an options window for the print index 134, and the user can then deselect/rearrange URLs, save this print index 134 for later use and the like.

The new HTML print control tags 140 of the preferred embodiment include a root URL tag 144. The root URL tag 144 defines the current URL to be the root of the document, serving as the anchor from which other portions of the document are linked, and in which the author's print index 134 is found. A pointer to root URL tag 146 is used to identify hypertext links that point to the Root URL document. In this way, when on any page that belongs to the Root document, the print function can orient to the root URL/print Index and print a cohesive document. Print Index sub-sets tags 148 are used by the document owner to define sub-set printings of the document. For example, to define a summary sub-set under which given URLs will print when this sub-set 148 is selected by the user, insert <Print sub-set> Summary </Print sub-set> into these URLs. There is no restriction that one URL belong to only one sub-set 148. A print order number 150 and a print order control 152 together define the order in which to print a URL in relation to other URLs in the document layout for the scattered method of printing. Two print order controls 152 are defined as a simple control 154 and a hierarchical control 156. With the simple print order control 154, the print order numbers 150 are a simple sequence. A URL assigned a print order number of 50 would print before URL with print order number of 60, and so on. It is assumed that the document originator has knowledge of all URLs in his document and assigns print order numbers 150 accordingly.

With the hierarchical print order control 156, a hierarchy scheme is applied to the whole document, with print order numbers 150 assigned to each URL segment in a hierarchical fashion, such as 1, 1.1, 2, 2.1. The Print Order Control HTML tag, as illustrated under kind of multi-print in FIG. 3, would then specify which of two hierarchical orders to print including a branch-first order, for example, a default option and a level-first order. The branch-first order prints 1, 1.1, 2, 2.1, where each branch is traversed before going to the next branch. The level-first order prints 1, 2, 1.1, 2.1, where highest level orders are printed first.

An override function allows override of HTML print tags that control the order of printing. For example, the user may want the summary portion of the document printed first instead of last. This may be done by dragging and dropping URLs in the Print Index window to re-order URLs for printing.

Auxiliary uses of the print index 134 are enabled by the grouping of URLs into one index 134 that can be applied to other functions besides printing: For example, a find option can be used with the print index 134 to search a set of URLs in one operation. The print index 134 can easily provide functions including a FIND, span all and a FIND, span scoped. The FIND, span all option in a print index 134 drop down searches text in all URLs in the print index 134, whether or not the URLs are selected for printing. The FIND-span scoped option searches text in only those URLs in the print index 134 selected for printing. This provides an easy way to control the scope of a Find whether or not you actually print the selected URLs. Spell check and other document-wide functions can in like manner span the URLs of the print index 134. Sharing of Print Indexes can be provided once a fine tuned print index 134, mechanisms can be used to share with others. For example, services can provide dedicated sites that contain useful print indexes 134, to be linked by related sites.

Referring now to FIG. 3, an exemplary display screen generally designated by 300 illustrates a user interface for providing user selected print options in accordance with the preferred embodiment. A user enters selections to confirm print index, select a kind of multi-print and the scatter kind, as illustrated in FIG. 3. A user selection of honor HTML tags overrides HTML tags that define the print index, manual and current page only print functions.

Figure 4:
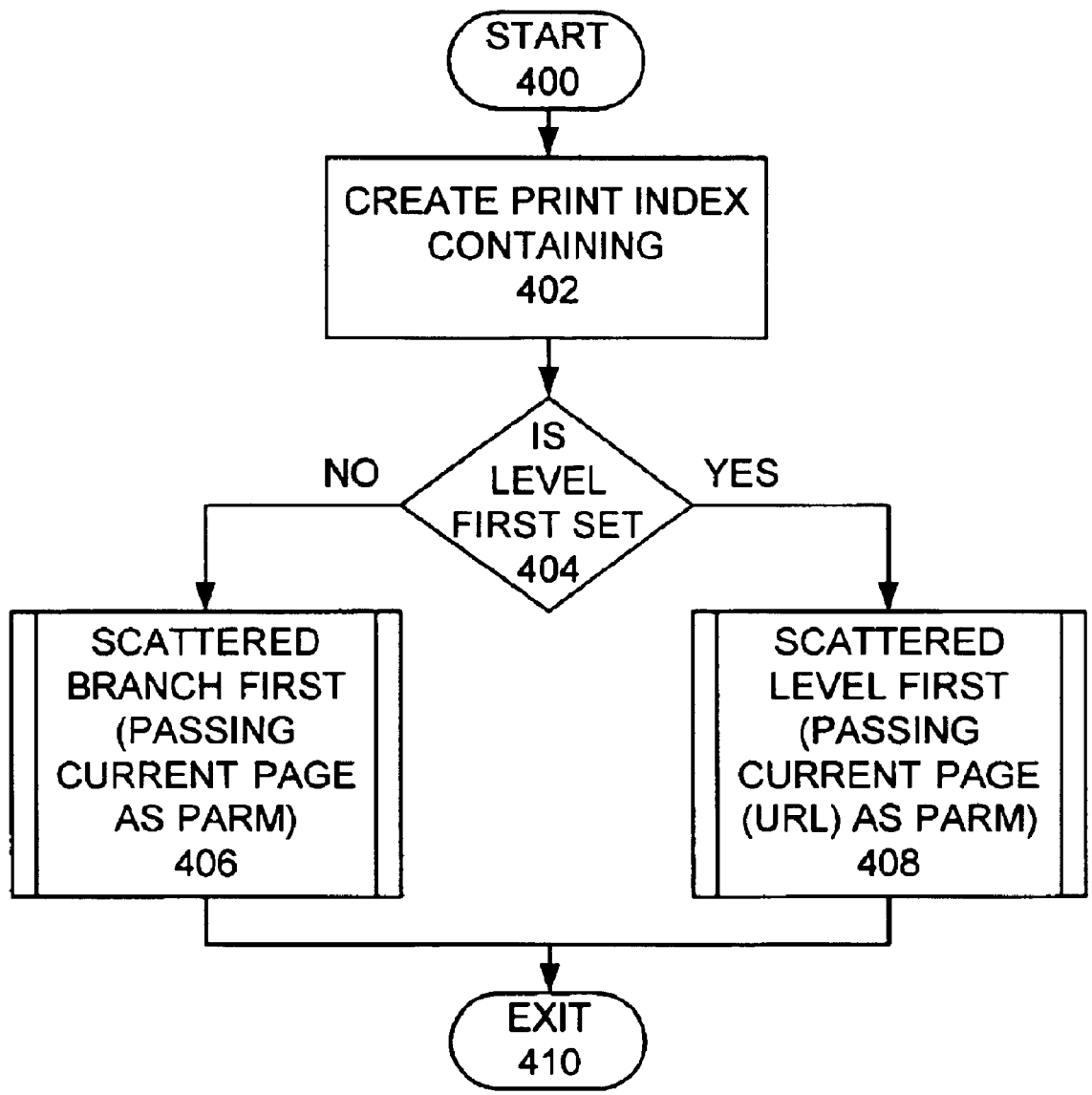
FIGS. 4, 5, 6 and 7 are flow charts illustrating exemplary steps for implementing web based document printing in accordance with the preferred embodiment.

FIGS. 4, 5, 6 and 7 illustrate exemplary steps for implementing web based document printing in accordance with the preferred embodiment. Referring to FIG. 4, exemplary steps to traverse and create the print index 134 are shown starting at a block 400. A print index is created as indicated at a block 402. Checking whether a scattered level first is set is performed as indicated at a decision block 404. If the scattered level first is not set, then a scattered branch first routine is performed, passing a current page as the parameter indicated at a block 406. With the scattered branch first routine, each branch is traversed before going to the next branch to print sequential branches. If the scattered level first is set, then a scattered level first routine is performed, passing a current page URL as the parameter indicated at a block 408. With the scattered level first routine, highest level orders are printed first.

Figure 5:
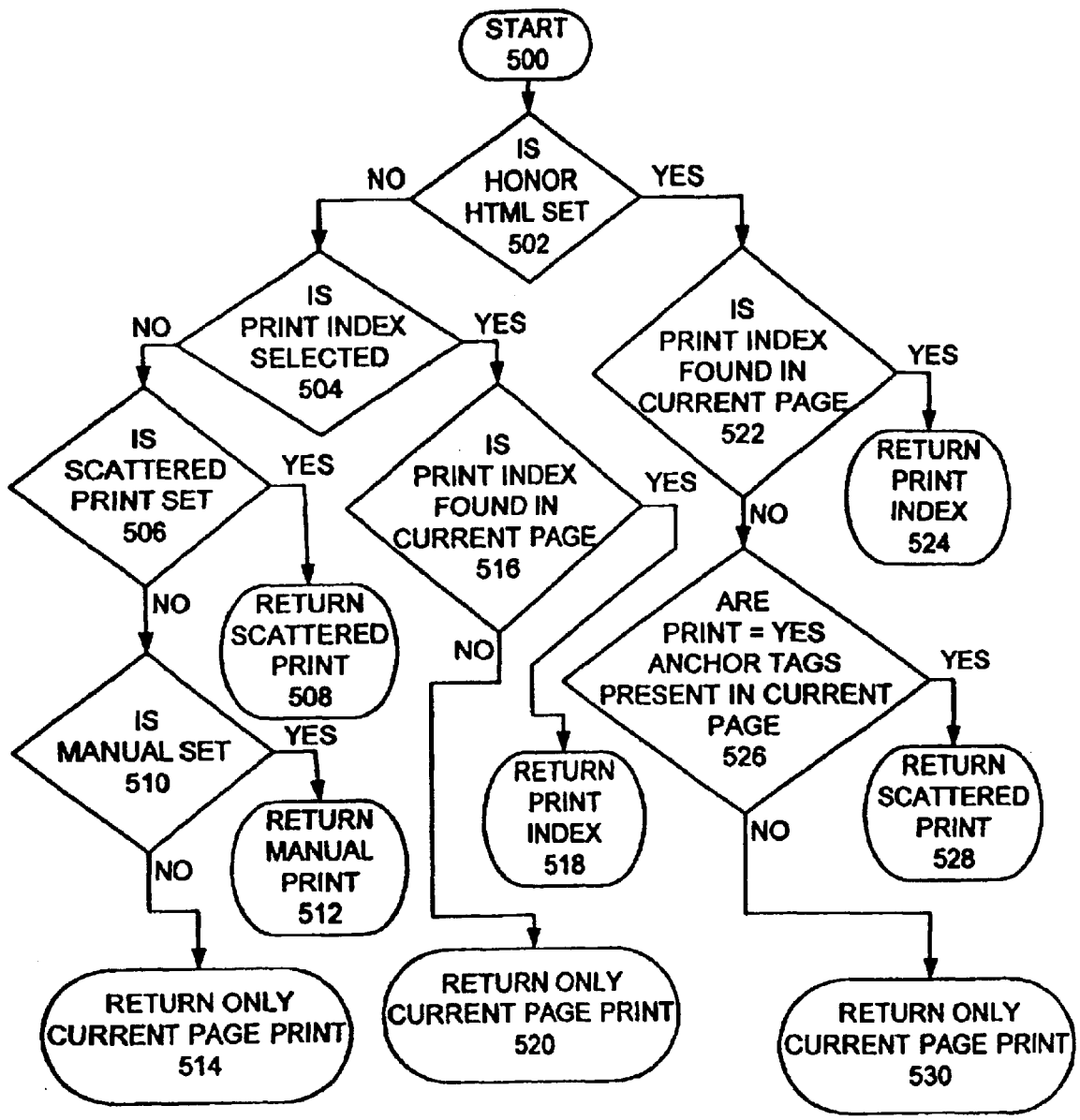

Referring to FIG. 5, exemplary steps to obtain a kind of multi-print are shown starting at a block 500. Checking for the honor HTML option is performed as indicated at a decision block 502. If the honor HTML option is not set, then checking whether the print index is selected is performed as indicated at a decision block 504. When the print index is not selected, checking for scattered print set is performed as indicated at a decision block 506. When scattered print is set, then the scattered print is returned as indicated at a block 508. When scattered print is not set, then checking whether manual is set is performed as indicated at a decision block 510. When manual is set, then manual print is returned as indicated at a block 512. When manual is not set, then only the current page print is returned as indicated at a block 514. When the print index is selected at block 504, then checking whether the print index is found in the current page as indicated at a decision block 516. When the print index is found in the current page, then the print index is returned as indicated at a block 518. When the print index is not found in the current page, then only the current page print is returned as indicated at a block 520. When the honor HTML option is set at block 502, checking whether the print index is found in the current page is performed as indicated at a decision block 522. When the print index is found in the current page, then the print index is returned as indicated at a block 524. When the print index is not found in the current page, then checking whether print=Yes and anchor tags are present in the current page is performed as indicated at a decision block 526. When print Yes and anchor tags are present in the current page, then the scattered print is returned as indicated at a block 528. Otherwise, only the current page print is returned as indicated at a block 530.

Figure 6:
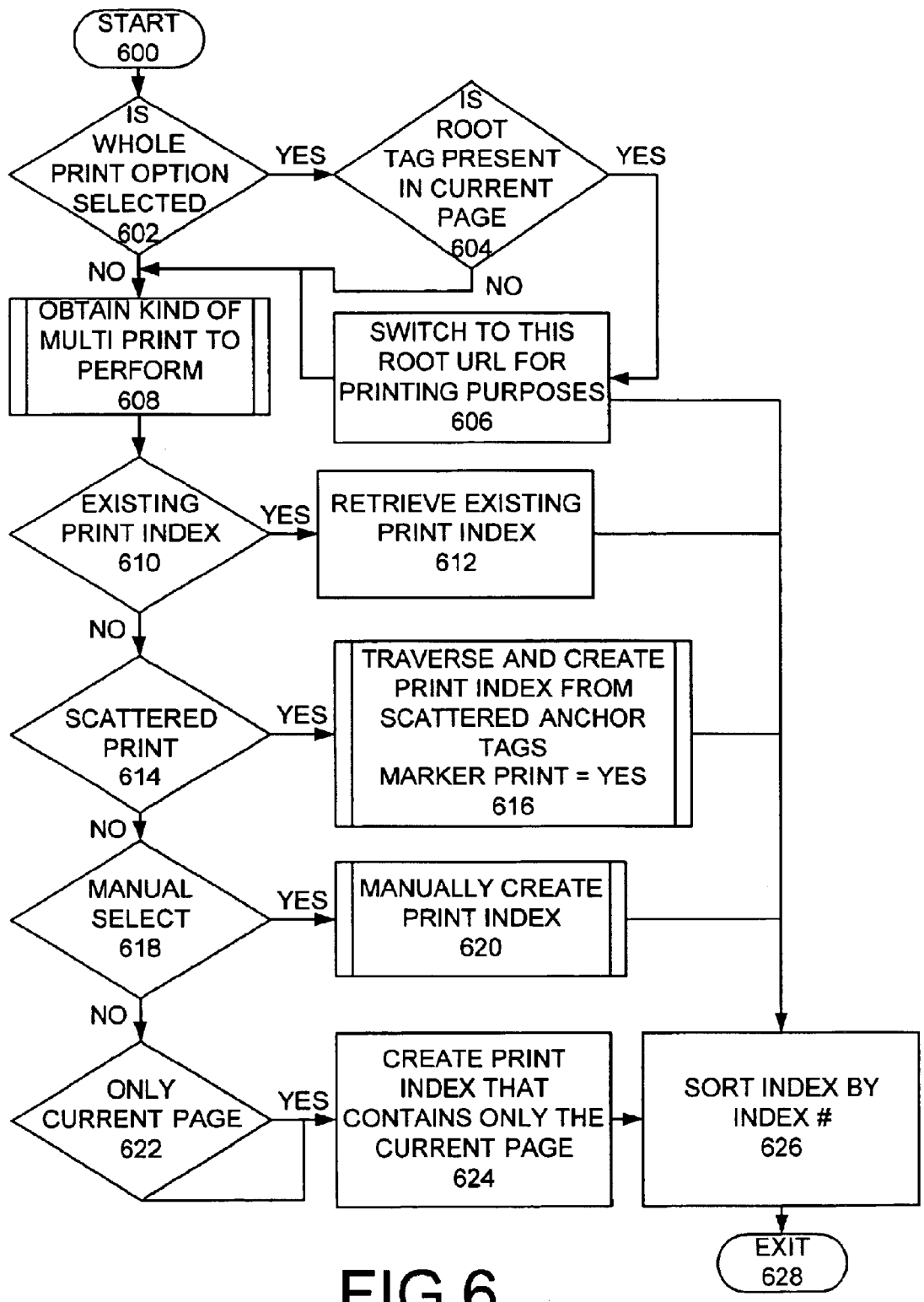

Referring to FIG. 6, exemplary steps to obtain the print index 134 are shown starting at a block 600. Checking whether the whole print option is selected is performed as indicated at a decision block 602. When the whole print option is selected, checking whether the root tag is present in the current page is performed as indicated at a decision block 604. When the root tag is present in the current page, then switching to this root URL for printing purposes is provided as indicated at a block 606. When the whole print option is not selected or when the root tag is not present in the current page at block 604, then the routine to obtain the kind of multi-print of FIG. 5 is performed as indicated at a block 608. Checking for an existing print index is performed as indicated at a decision block 610. When an existing print index is identified, then the existing print index is retrieved as indicated at a block 612. When an existing print index is not identified, then checking for the scattered print option is performed as indicated at a decision block 614. When the scattered print option is identified, then the routine to traverse and create the print index from scattered anchor tags with marker print equals yes as indicated at a block 616. When the scattered print option is not identified, then checking for the manual selection is performed as indicated at a decision block 618. When the manual selection is identified, then the print index is manually created as indicated at a block 620. When the manual selection is not identified, then checking for only current page option is performed as indicated at a decision block 622. Then the print index that contains only the current page is created as indicated at a block 624. The print index from any of the blocks 612, 616, 620 and 624 is sorted by index number as indicated at a block 626. This completes the sequential obtain print index operations as indicated at a block 628.

Figure 7:
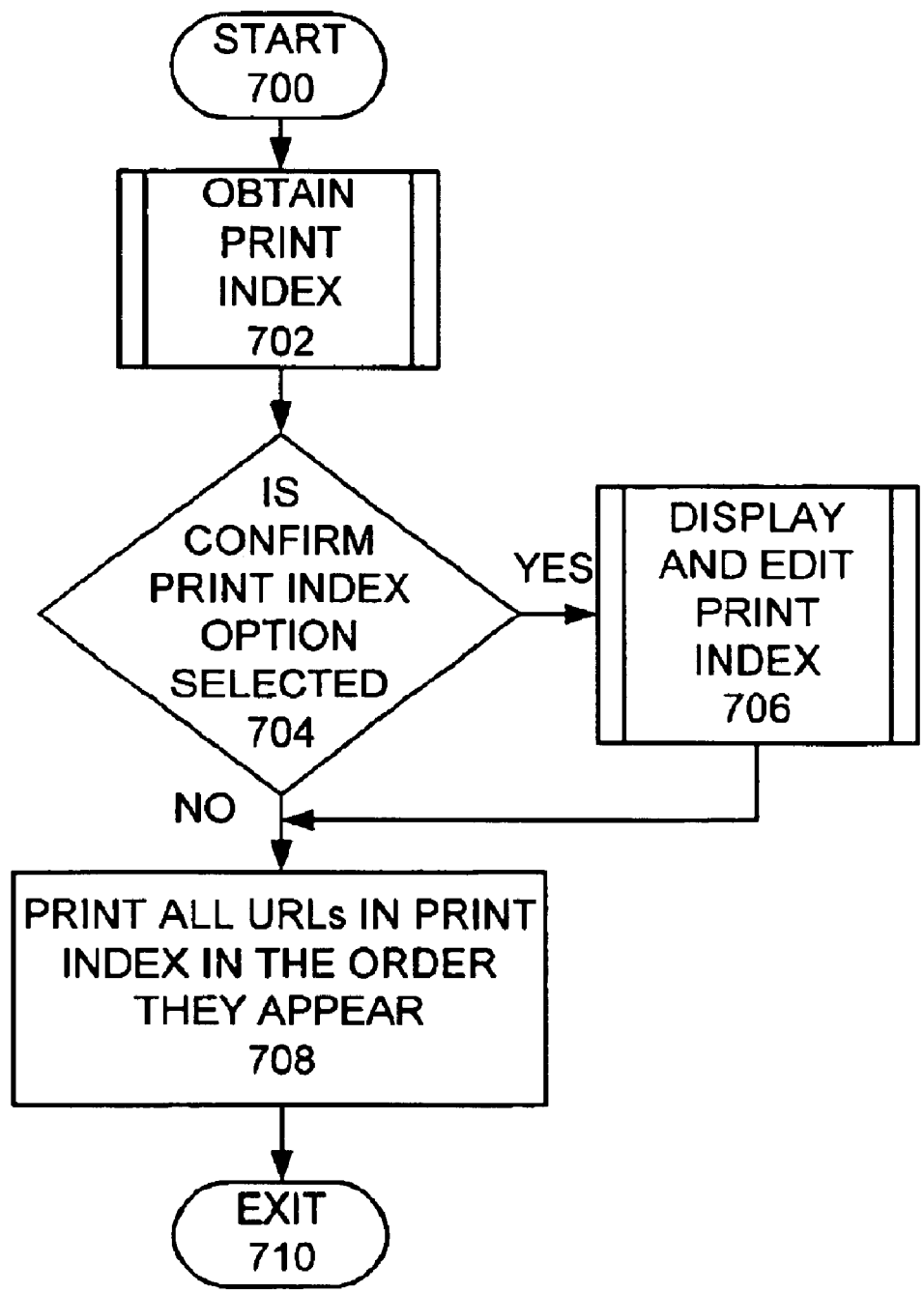

Referring to FIG. 7, exemplary print function steps are shown starting at a block 700. First the obtain print index routine of FIG. 6 are performed as indicated at a block 702. Checking whether confirm print index option is selected is performed as indicated at a decision block 704. When the confirm print index option is selected, then the routine to display and edit the print index is performed as indicated at a block 706. When the confirm print index option is not selected, then all URLs in the print index are printed in the order that the URLs appear in the print index is provided as indicated at a block 708. This completes the sequential print function operations as indicated at a block 710.

Figure 8:
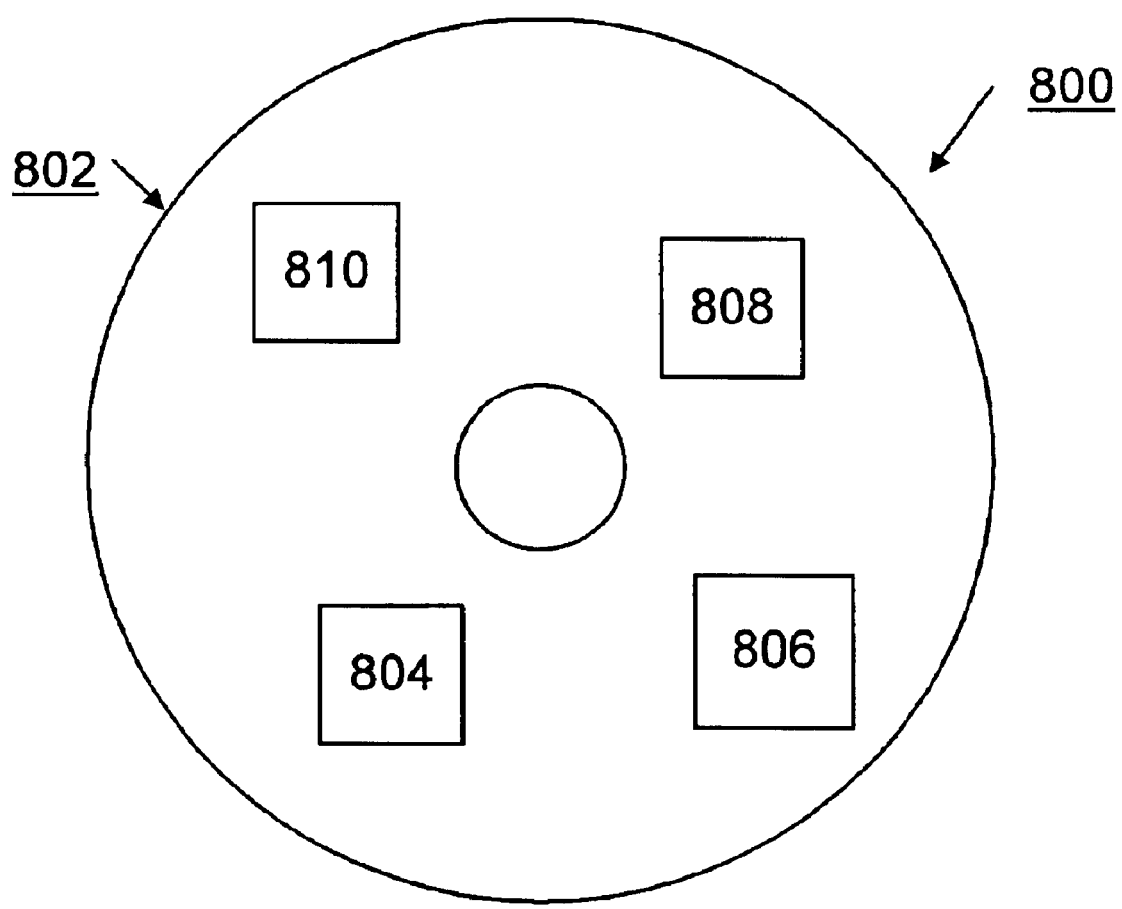
FIG. 8 is a block diagram illustrating a computer program product in accordance with the preferred embodiment.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 for carrying out the methods for implementing web based document printing of the preferred embodiment in the system 100 of FIGS. 1 and 2.

A sequence of program instructions or a logical assembly of one or more interrelated modules defined by the recorded program means 804, 806, 808, 810, direct the computer system 100 for implementing web based document printing of the preferred embodiment.

While the present invention has been described with reference to the details of the embodiments of the invention shown in the drawing, these details are not intended to limit the scope of the invention as claimed in the appended claims.

What is claimed is:

1. A method for implementing web based document printing comprising:

obtaining a print index; said print index explicitly specified by a web based document originator;

identifying uniform resource locators (URLs) in said print index;

sequentially printing said URLs in said print index;

checking for a user selection of honor HTML, responsive to identifying said user selection of honor HTML, checking for a print index in the current page;

responsive to not identifying said user selection of honor HTML, checking for a user selection of print index;

responsive to not identifying said user selection of print index, checking for a user selection of scattered print and responsive to identifying said user selection of scattered print, returning scattered print; and wherein obtaining said print index includes obtaining a kind of multi print to perform.

2. The method for implementing web based document printing comprising:

obtaining a print index; said print index explicitly specified by a web based document originator;

identifying uniform resource locators (URLs) in said print index;

sequentially printing said URLs in said print index;

checking for a user selection of honor HTML, responsive to identifying said user selection of honor HTML, checking for a print index in the current page;

responsive to not identifying said user selection of honor HTML, checking for a user selection of print index;

responsive to not identifying said user selection of print index, checking for a user selection of manual print and responsive to identifying said user selection of manual print, returning manual print; and wherein obtaining said print index includes obtaining a kind of multi print to perform.

3. The method for implementing web based document printing comprising:

obtaining a print index; said print index explicitly specified by a web based document originator;

identifying uniform resource locators (URLs) in said print index;

sequentially printing said URLs in said print index;

checking for a scattered print option, and responsive to identifying said scattered print option, creating a print index from scattered anchor tags marked print equal to yes; and wherein obtaining said print index includes obtaining a kind of multi print to perform.

4. The method for implementing web based document printing comprising:

obtaining a print index; said print index explicitly specified by a web based document originator;

identifying uniform resource locators (URLs) in said print index;

sequentially printing said URLs in said print index;

checking for a manual print option, and responsive to identifying said manual print option, manually creating a print index; and wherein obtaining said print index includes obtaining a kind of multi print to perform.

* * * * *